United States Patent
Yang et al.

(10) Patent No.: US 11,429,818 B2
(45) Date of Patent: Aug. 30, 2022

(54) METHOD, SYSTEM AND DEVICE FOR MULTI-LABEL OBJECT DETECTION BASED ON AN OBJECT DETECTION NETWORK

(71) Applicant: INSTITUTE OF AUTOMATION, CHINESE ACADEMY OF SCIENCES, Beijing (CN)

(72) Inventors: Guodong Yang, Beijing (CN); Yunong Tian, Beijing (CN); En Li, Beijing (CN); Zize Liang, Beijing (CN); Min Tan, Beijing (CN); Fengshui Jing, Beijing (CN); Zishu Gao, Beijing (CN); Hao Wang, Beijing (CN); Yuansong Sun, Beijing (CN); Sixi Lu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 243 days.

(21) Appl. No.: 16/960,072

(22) PCT Filed: Dec. 10, 2019

(86) PCT No.: PCT/CN2019/124287
§ 371 (c)(1),
(2) Date: Sep. 10, 2020

(87) PCT Pub. No.: WO2020/177432
PCT Pub. Date: Sep. 10, 2020

(65) Prior Publication Data
US 2021/0224609 A1    Jul. 22, 2021

(30) Foreign Application Priority Data
Mar. 7, 2019  (CN) .......................... 201910172679.5

(51) Int. Cl.
G06K 9/62    (2022.01)
G06N 3/08    (2006.01)
G06V 10/75   (2022.01)

(52) U.S. Cl.
CPC ......... *G06K 9/6265* (2013.01); *G06K 9/6256* (2013.01); *G06N 3/084* (2013.01); *G06V 10/7557* (2022.01)

(58) Field of Classification Search
CPC ....... G06K 9/6293; G06V 20/40; G06V 20/52
See application file for complete search history.

(56) References Cited

U.S. PATENT DOCUMENTS 6,829,382 B2 * 12/2004 Lee ........................... G06T 7/12
                                                           382/199
6,985,780 B2 *  1/2006 Hudson .............. G05B 19/0421
                                                           709/201

(Continued)

FOREIGN PATENT DOCUMENTS

CN    109117794 A    1/2019
CN    109858569 A    6/2019

OTHER PUBLICATIONS

Joseph Redmon, et al., YOLOv3: An Incremental Improvement, Apr. 8, 2018.

(Continued)

*Primary Examiner* — Yosef Kassa
(74) *Attorney, Agent, or Firm* — Bayramoglu Law Offices LLC

(57) ABSTRACT

A multi-label object detection method based on an object detection network includes: selecting an image of an object to be detected as an input image; based on a trained object detection network, obtaining a class of the object to be detected, coordinates of a center of the object to be detected, and a length and a width of a detection rectangular box according to the input image; and outputting the class of the (Continued)

object to be detected, the coordinates of the center of the object to be detected, and the length and the width of the detection rectangular box. The method of the present invention can perform real-time and accurate object detection on different classes of objects with improved detection speed and accuracy, and can solve the problem of object overlapping and occlusion during the object detection.

20 Claims, 5 Drawing Sheets

(56) References Cited

U.S. PATENT DOCUMENTS

| | | | | |
|---|---|---|---|---|
| 7,174,224 B2* | 2/2007 | Hudson | ............... | G05B 19/0421 700/20 |
| 7,436,887 B2* | 10/2008 | Yeredor | ........... | G08B 13/19604 375/240.01 |
| 7,742,641 B2* | 6/2010 | Ivanov | ................. | G06K 9/6293 382/190 |
| 9,052,386 B2* | 6/2015 | Yeredor | ................... | H04N 5/76 |

OTHER PUBLICATIONS

Zheng Zhi-Qiang, et al., Application of Improved YOLO V3 in Aircraft Recognition of Remote Sensing Images, Electronics Optics & Control, Apr. 2019, pp. 28-32, vol. 26, No. 4.
Dai Weicong, et al, Real-time airplane detection algorithm in remote-sensing images based on improved YOLOv3, Opto-Electronic Engineering, 2018, pp. 1-9, vol. 45, Issue 12.

* cited by examiner obtaining an image of an object to be detected according to the image of the object to be detected, obtaining a class and parameters of the object to be detected by a trained object detection network outputting the class and the parameters of the object to be detected

METHOD, SYSTEM AND DEVICE FOR MULTI-LABEL OBJECT DETECTION BASED ON AN OBJECT DETECTION NETWORK

CROSS REFERENCE TO THE RELATED APPLICATIONS

This application is the national phase entry of International Application No. PCT/CN2019/124287, filed on Dec. 10, 2019, which is based upon and claims priority to Chinese Patent Application No. 201910172679.5, filed on Mar. 7, 2019, the entire contents of which are incorporated herein by reference.

TECHNICAL FIELD

The present invention pertains to the field of computer vision, and more particularly, relates to a method, system and device for multi-label object detection based on an object detection network.

BACKGROUND

With the rapid expansion and maturity of artificial intelligence and machine learning technologies in recent years, the autonomous object detection technologies have become an active area in deep learning research in China and other countries and has broad application prospects in the fields such as intelligent transportation, medical image processing, robotics, and agricultural Internet of things. In real life, there are a great variety of individual objects with complicated distributions, and humans can sense the shape, color, texture and distance of an object to accurately identify the class and position of the object. This process, however, has been a challenging task in computer vision. Therefore, current object detection technologies are facing the challenge of enabling computers to possess the object detection capability close to or even superior to that of humans.

The method in the prior art for researching the object detection mainly includes: extracting the color, shape, texture and other features of the object to obtain an object description, then employing a specific machine learning algorithm to learn the class, position and contour of the object, and finally classifying and locating the object and delineating the boundaries of the object. However, in some cases, the extracted features are generally difficult to reflect inter-cluster variation and intra-cluster similarity due to the large intra-cluster variation high inter-cluster similarity. Especially when the object has multiple labels, the features used by different labels are generally not associated due to the limitation of traditional feature extraction methods, which causes much more difficulty in identifying the object. In the practical object detection, the presence of object overlapping and occlusion blurs the inter-cluster classification boundary and the intra-cluster distinction, which also poses a great challenge in practical object detection.

Currently, two main methods for realizing multi-label object detection include a traditional image processing-based method and a deep learning method. The traditional image processing-based method for object detection includes: first extracting a number of Haar features, scale-invariant feature transform (SIFT) features, histograms of oriented gradient (HOG) features, speeded up robust features (SURF), deformable part model (DPM) features and others from the object image, then using traditional classifiers to obtain the prediction results of class and the position information of the object. This method has a relatively fast detection speed but a relatively low detection accuracy, and the features are generally extracted manually, resulting in a large workload and a lack of universal applicability. The existing deep learning method for object detection mainly includes the following two approaches. The first approach typically employs a candidate region-based object detection network such as region-based convolutional neural network (R-CNN), which has significantly improved accuracy and speed of detection, but it is difficult to achieve real-time detection on high-resolution image. The second approach typically employs an object detection network such as You Only Look Once (YOLO) network that converts the object detection problem into a regression problem, which has a fast detection speed, but a slightly lower detection accuracy of algorithm.

In general, although numerous object detection networks have been developed in the current field, desired results cannot be obtained due to difficulties in ensuring both the high detection speed and high accuracy as needed.

SUMMARY

In order to solve the above-mentioned problems in the prior art, that is, to solve the problem that existing object detection technologies cannot give consideration to both the detection speed and the detection accuracy, the present invention provides a multi-label object detection method based on an object detection network, including:

step S10, selecting an image of an object to be detected as an input image;

step S20, based on a trained object detection network, obtaining a class of the object to be detected, coordinates of a center of the object to be detected, and a length and a width of a detection rectangular box according to the input image; and step S30, outputting the class of the object to be detected, the coordinates of the center of the object to be detected, and the length and the width of the detection rectangular box.

The object detection network is obtained by replacing a low-resolution feature layer in a YOLO-V3 network with a densely connected convolutional network.

In some preferred embodiments, steps of training the object detection network include:

step B10, adjusting an attribute of each image in an obtained training image set according to a standard format to obtain a standardized training image set;

step B20, detecting a batch of images in the standardized training image set by using the object detection network, and calculating a training error of each classifier of the object detection network;

step B30, when a preset number of training iterations is not reached or the training error is not lower than a preset threshold, obtaining a variation of a parameter of each layer and updating a parameter of the object detection network by an error back propagation method; and step B40, detecting the standardized training image set in a batching sequence by the updated object detection network, and iteratively updating the parameter of the object detection network by the error back propagation method in step B30 until the preset number of the training iterations is reached or the training error is lower than the preset threshold to obtain the trained object detection network.

In some preferred embodiments, the training error is calculated by the following formula:

$$\text{Loss} = \text{Error}_{coord} + \text{Error}_{iou} + \text{Error}_{cls}$$

where, Loss denotes the training error, $Error_{coord}$ denotes a prediction error of the coordinates, $Error_{iou}$ denotes an Intersection over Union (IoU) error between a predicted bounding box and a true bounding box, and $Error_{cls}$ denotes a classification error.

In some preferred embodiments, the prediction error of the coordinates is calculated by the following formula:

$$Error_{coord} = \lambda_{coord} \sum_{i=1}^{S^2} \sum_{j=0}^{B} l_{ij}^{obj}[(x_i - \hat{x}_i)^2 + (y_i - \hat{y}_i)^2] +$$

$$\lambda_{coord} \sum_{i=1}^{S^2} \sum_{j=0}^{B} l_{ij}^{obj}\left[\left(\sqrt{w_i} - \sqrt{\hat{w}_i}\right)^2 + \left(\sqrt{h_i} - \sqrt{\hat{h}_i}\right)^2\right]$$

where, $\lambda_{corrd}$ denotes a weight assigned to the error of the coordinates; $S^2$ denotes the number of grids divided from the input image, B denotes the number of bounding boxes generated from each grid; $1_{ij}^{obj}=1$ indicates that the object falls into the $j^{th}$ bounding box of the $i^{th}$ grid, and $1_{ij}^{obj}=0$ indicates that the object does not fall into the $j^{th}$ bounding box of the $i^{th}$ grid; $\hat{x}_i$ and $\hat{y}_i$ denote a predicted x coordinate value of the center of the bounding box and a predicted y coordinate value of the center of the bounding box, respectively; $\hat{w}_i$ and $\hat{h}_i$ denote a predicted length of the bounding box and a predicted width of the bounding box, respectively; $x_i$ and $y_i$ denote a true x coordinate value of the center of the bounding box and a true y coordinate value of the center of the bounding box, respectively; and $w_i$ and $h_i$ denote a true width of the bounding box and a true length of the bounding box, respectively.

In some preferred embodiments, the IoU error between the predicted bounding box and the true bounding box is calculated by the following formula:

$$Error_{iou} = \sum_{i=1}^{S^2} \sum_{j=0}^{B} l_{ij}^{obj}(C_i - \hat{C}_i)^2 + \lambda_{noobj} \sum_{i=1}^{S^2} \sum_{j=0}^{B} l_{ij}^{obj}(C_i - \hat{C}_i)^2$$

where, $\lambda_{noobj}$ denotes a weight assigned to the IoU error between the predicted bounding box and the true bounding box, $S^2$ denotes the number of the grids divided from the input image, B denotes the number of the bounding boxes generated from each grid, $1_{ij}^{obj}=1$ indicates that the object falls into the $j^{th}$ bounding box of the $i^{th}$ grid, and $1_{ij}^{obj}=0$ indicates that the object does not fall into the $j^{th}$ bounding box of the $i^{th}$ grid, $\hat{C}_i$ denotes a predicted confidence coefficient over predicting the class, and $C_i$ denotes a true confidence coefficient.

In some preferred embodiments, the classification error is calculated by the following formula:

$$Error_{cls} = \sum_{i=0}^{S^2} l_{ij}^{obj} \sum_{c \in classes} (p_i(c) - \hat{p}_i(c))^2$$

where, $S^2$ denotes the number of the grids divided from the input image, $1_{ij}^{obj}=1$ indicates that the object falls into the $j^{th}$ bounding box of the $i^{th}$ grid, and $1_{ij}^{obj}=1$ indicates that the object does not fall into the $j^{th}$ bounding box of the $i^{th}$ grid, $\hat{p}_i(c)$ denotes a predicted probability that the object in the $i^{th}$ grid belongs to class c, $p_i(c)$ denotes a true probability that the object in the $i^{th}$ grid belongs to class c.

In some preferred embodiments, before the step B10 of "adjusting an attribute of each image in an obtained training image set according to a standard format", the method further includes the following step of performing enhancement processing on the training image set:

performing data enhancement on each image in the training image set by one or more selected from the group consisting of a color normalization method, a brightness transformation method, an angle transformation method, and a blurring processing method, to obtain an enhanced training image set.

According to another aspect of the present invention, a multi-label object detection system based on an object detection network is provided, including an input module, an object detection module, an image enhancement module, an image format standardization module, and an output module.

The input module is configured to acquire and input an image of an object to be detected.

The object detection module is configured to process the image of the object to be detected to obtain a class of the object to be detected, coordinates of a center of the object to be detected, and a length and a width of a detection rectangular box.

The image enhancement module is configured to perform data enhancement on a training image set by using one or more selected from the group consisting of a color normalization method, a brightness transformation method, an angle transformation method, and a blurring processing method.

The image format standardization module is configured to adjust an attribute of each image in the training image set according to a standard format.

The output module is configured to output the class of the object to be detected, the coordinates of the center of the object to be detected, and the length and the width of the detection rectangular box.

According to the third aspect of the present invention, a storage device is provided. A plurality of programs are stored in the storage device, and the plurality of programs are loaded and executed by a processor to achieve the multi-label object detection method based on the object detection network mentioned above.

According to the fourth aspect of the present invention, a processing device is provided, including a processor and a storage device. The processor is configured to execute a plurality of programs. The storage device is configured to store the plurality of programs. The plurality of programs are loaded and executed by the processor to achieve the multi-label object detection method based on the object detection network mentioned above.

The advantages of the present invention are as follows.

(1) Aiming at the problem of real-time detection of different classes of objects in the image, the method of the present invention employs the densely connected convolutional network (DenseNet) to improve the YOLO-V3 network, thereby realizing real-time and accurate detection of different classes of objects.

(2) Compared with the faster region-based convolutional neural network (Faster R-CNN) method and other traditional methods, the method of the present invention can perform faster and high-accuracy object detection and can well solve the problem of object overlapping and occlusion during the object detection.

BRIEF DESCRIPTION OF THE DRAWINGS

Other features, objectives and advantages of the present invention will be expressly described with reference to the detailed description of the non-restrictive embodiments and the drawings.

DETAILED DESCRIPTION OF THE EMBODIMENTS

Figure 1:
FIG. 1 is a schematic flow chart of the multi-label object detection method based on the object detection network of the present invention.
Figure 1:

The present invention will be further described in detail hereinafter with reference to the drawings and embodiments. It can be understood that the specific embodiments described herein are only intended to illustrate the present invention, rather than to limit the present invention. In addition, for convenience of the description, only parts related to the present invention are shown in the drawings.

It should be noted that the embodiments in the present invention and features in the embodiments can be combined without conflicting with each other. Hereinafter, the present invention will be described in detail with reference to the drawings and embodiments.

Directed to the problems such as low accuracy and low speed of object detection using traditional convolutional neural networks, the present invention provides a multi-label object detection method based on an object detection network. According to the present invention, the object is quickly detected by the regression method and the low-resolution feature layer in the object detection network in the prior art is improved by the DenseNet to achieve feature reuse, thereby improving the feature utilization rate and detection accuracy.

In the present invention, the multi-label object detection method based on the object detection network includes the following steps.

Step S10, an image of an object to be detected is selected as an input image.

Step S20, based on a trained object detection network, a class of the object to be detected, coordinates of a center of the object to be detected, and a length and a width of a detection rectangular box are obtained according to the input image.

Step S30, the class of the object to be detected, the coordinates of the center of the object to be detected, and the length and the width of the detection rectangular box are output.

The object detection network is obtained by replacing a low-resolution feature layer in a YOLO-V3 network with a densely connected convolutional network.

In order to more clearly illustrate the multi-label object detection method based on the object detection network of the present invention, each step of the method embodiment of the present invention is described in detail below with reference to FIG. 1.

Specifically, an embodiment of the multi-label object detection method based on the object detection network includes the following steps S10-S30.

Step S10, an image of an object to be detected is selected as an input image.

Step S20, based on a trained object detection network, a class of the object to be detected, coordinates of a center of the object to be detected, and a length and a width of a detection rectangular bounding box are obtained according to the input image. The object detection network is obtained by replacing a low-resolution feature layer in a YOLO-V3 network with a densely connected convolutional network.

Figure 3:
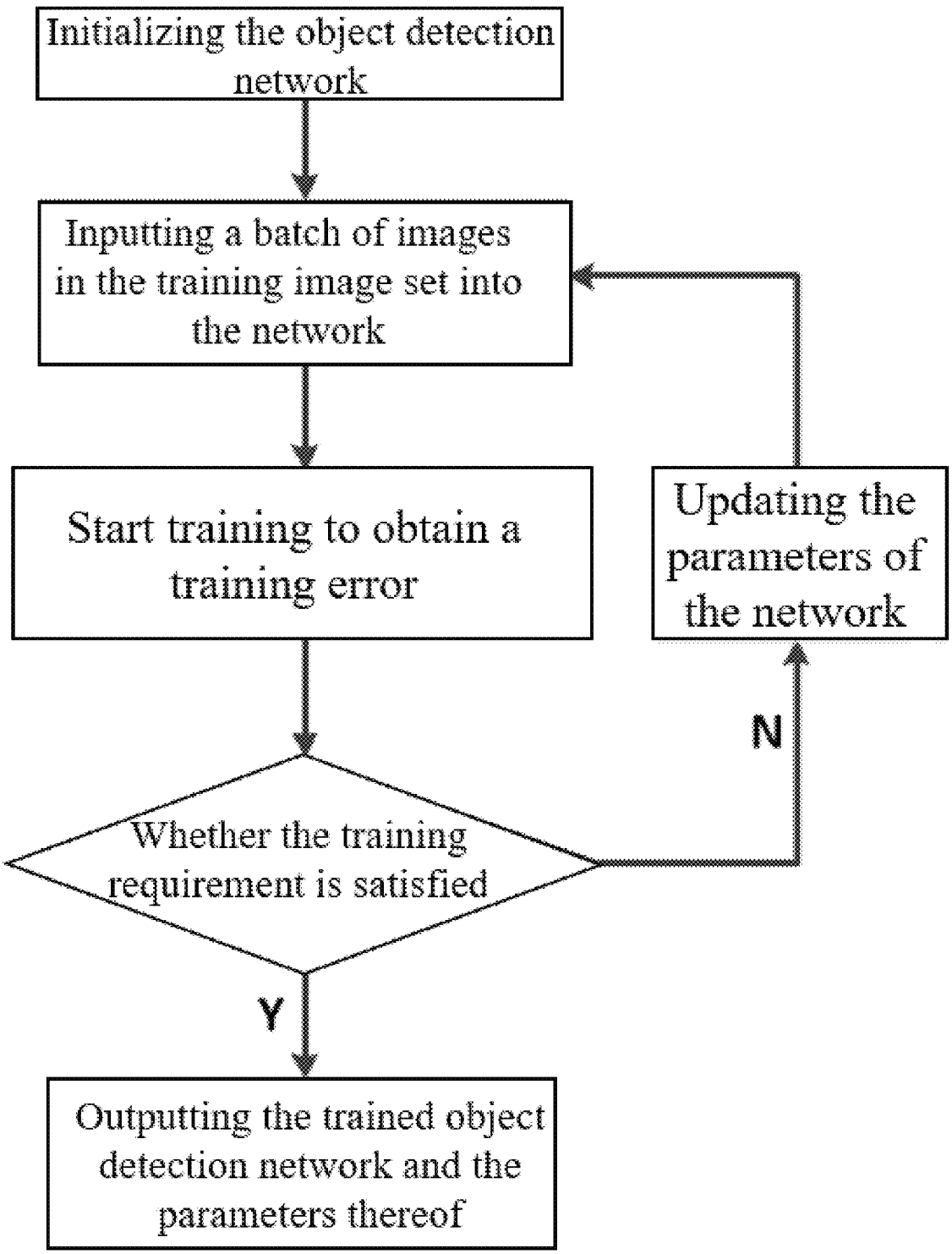
FIG. 3 is a schematic flow chart showing the training process of the object detection network according to an embodiment of the multi-label object detection method based on the object detection network of the present invention.

As shown in FIG. 3, the first embodiment of the multi-label object detection method based on the object detection network includes the following steps.

Step B10, an attribute of each image in an obtained training image set is adjusted according to a standard format to obtain a standardized training image set.

In the present embodiment of the present invention, detection of apple images at different growth stages in an orchard is taken as an example, and the training image set includes apple images in three stages, i.e., a young fruit stage, a growth stage, and a mature stage.

In the present invention, formats of the images in the training image set are standardized into the PASCAL visual object classes (VOC) format through the following steps.

(1) The long side of the image in the image set to be trained is adjusted to 500 pixels, and the short side of the image is adjusted according to the scaling of the long side.

(2) The adjusted image is renamed according to the PASCAL VOC format.

(3) Labels are added to the renamed image, bounding boxes are drawn on apples in the image, and the apples in the bounding boxes are classified into three classes including the young fruit stage, the growth stage, and the mature stage that are denoted by 1, 2, and 3, respectively.

(4) The standardized training image set in the PASCAL VOC format is generated.

(5) The images in the standardized training image set are adjusted to $24n \times 24n$ pixel size by a Darknet, where n is a positive integer.

Before the step B10 of "an attribute of each image in an obtained training image set is adjusted according to a standard format", the multi-label object detection method based on the object detection network further includes the following step of performing enhancement processing on the training image set.

Data enhancement is performed on each image in the training image set by one or more selected from the group consisting of a color normalization method, a brightness transformation method, an angle transformation method, and a blurring processing method, to obtain an enhanced training image set.

Figure 2:
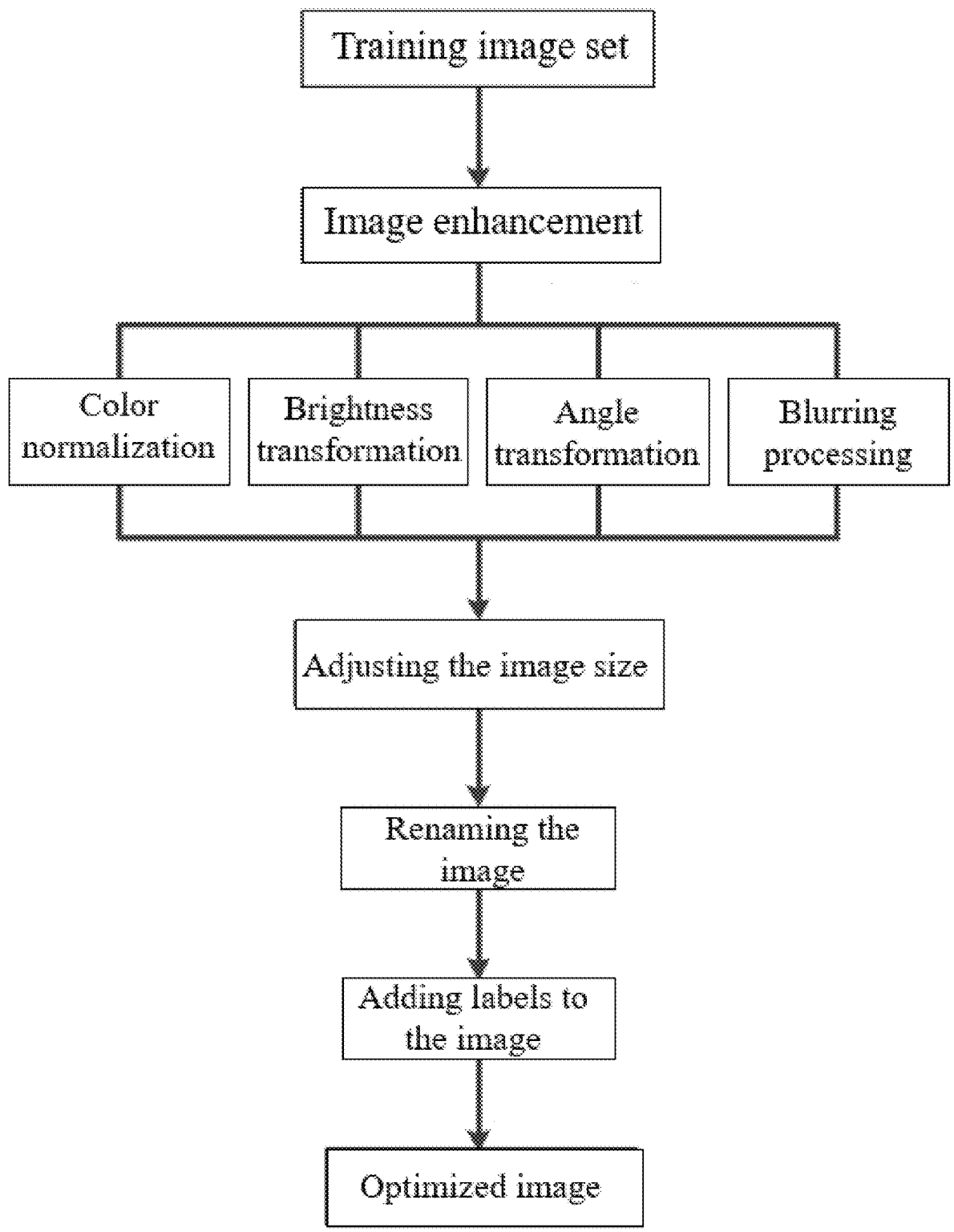
FIG. 2 is a schematic flow chart showing the optimization process of the training image set according to an embodiment of the multi-label object detection method based on the object detection network of the present invention.

In order to enhance the detection effect, the image enhancement processing can be performed on the images in the training image set. FIG. 2 is a schematic flow chart showing an optimization process of the training image set according to an embodiment of the multi-label object detection method based on the object detection network of the present invention. Image optimization includes image enhancement processing and image format standardization. The image enhancement processing includes at least one selected from the group consisting of color normalization, a brightness transformation, an angle transformation, and blurring processing. The image enhancement processing methods include, but are not limited to, the color normalization, the brightness transformation, the angle transformation, the blurring processing, and other processing methods not listed herein.

The processes of the several image enhancement processing methods including the color normalization, the brightness transformation, the angle transformation and the blurring processing are specifically described as follows:

The color normalization method performs the color normalization processing by a color normalization algorithm (i.e., the Gray World algorithm). The Gray World algorithm is based on the gray world hypothesis, wherein the gray world hypothesis assumes that for an image with a number of color changes, the average of the three components red (R), green (G) and blue (B) tends to the same gray value. In a physical sense, the gray world method assumes that the average reflectance on light in a natural scene is a fixed value overall, and this fixed value is approximately "gray". This hypothesis is forcedly applied to the training image set by the color normalization algorithm to eliminate the influence of ambient light on the image and obtain the original scene image of the training image set.

The brightness transformation method performs the brightness transformation processing on the training image set by randomly selecting different brightness values within a preset brightness range. In the embodiment of the present invention, two values within the range of 0.6 to 1.4 times the brightness of the original image are randomly selected to regulate the brightness of the training image set.

The angle transformation method performs rotations by different angles and mirroring processing on the training image set. In the embodiment of the present invention, rotations by 90°, 180° and 270° and the mirroring processing are performed on the original image.

The Blurring processing method performs stochastic blurring processing on the training image set or at least one class of processed images after being subjected to the color normalization, brightness transformation, and angle transformation.

480 original images captured in the orchard are processed by the image enhancement processing methods mentioned above to obtain the enhanced standardized training image set containing 4,800 images. The 4,800 images include 1600 images of apples in each stage of the young fruit stage, the growth stage, and the mature stage, respectively.

Step B20, a batch of images in the standardized training image set are detected by using the object detection network, and a training error of each classifier of the object detection network is calculated.

Figure 4:
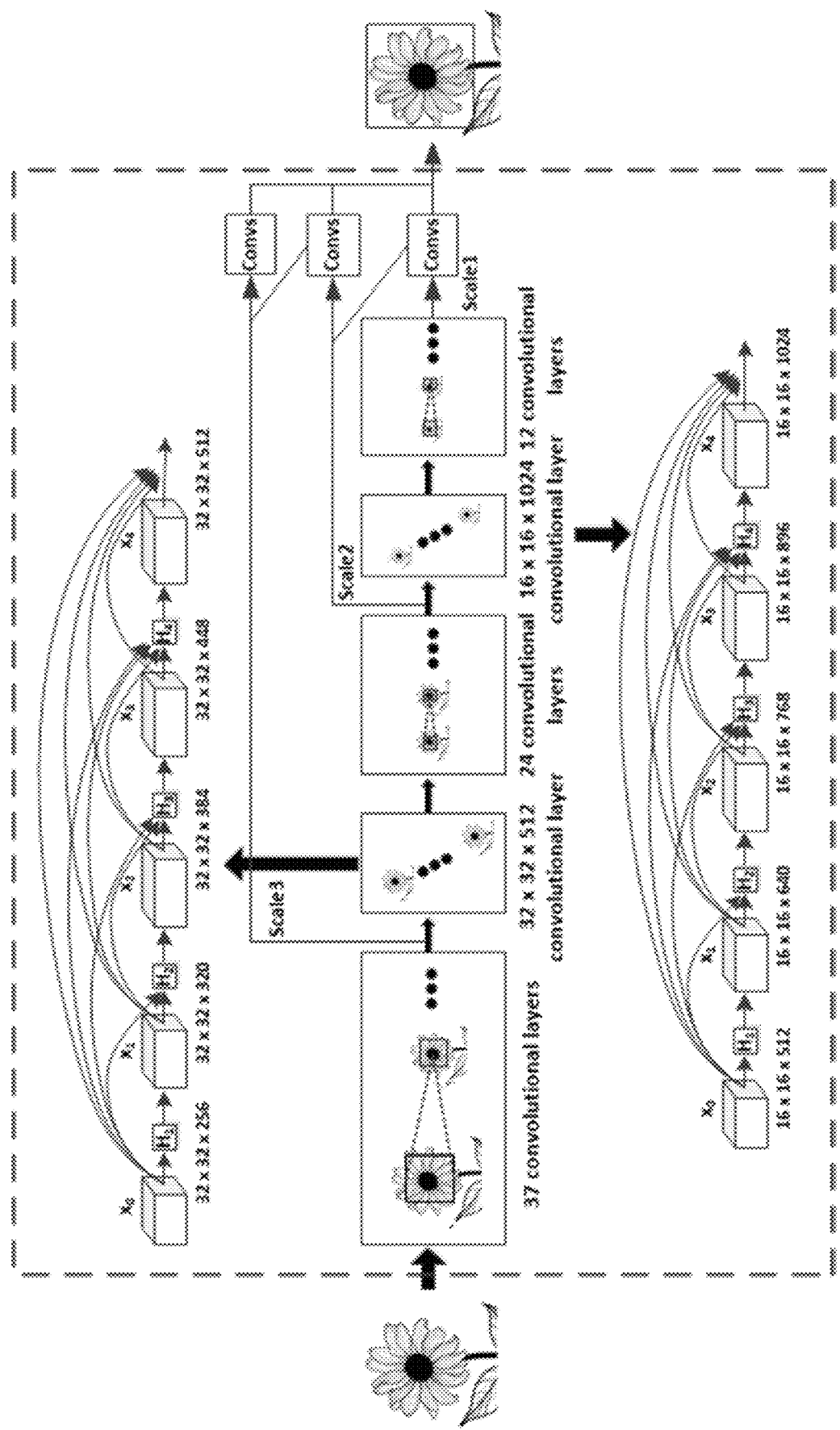
FIG. 4 is a schematic diagram showing the architecture of the object detection network according to an embodiment of the multi-label object detection method based on the object detection network of the present invention.

In the present invention, the down-sampling layers with the resolutions of 32×32 and 16×16 in the detection network are replaced with the DenseNet to improve the feature utilization rate of the low-resolution feature layers in the detection network. FIG. 4 is a schematic diagram showing the architecture of the object detection network according to an embodiment of the multi-label object detection method based on the object detection network of the present invention, wherein convolutional layers denote the convolutional layers, Scale denotes the size of the convolutional layers, and Convs denotes a convolution operation. The $H_l$ function in the DenseNet layer use a combination function of batch normalization (BN), rectified linear unit (ReLU), and convolution (Cony), and has the architecture of BN-ReLU-Conv (1×1)-BN-ReLU-Conv (3×3) to realize a nonlinear transformation of the $x_{l-1}$ layer. In the feature layer with a resolution of 32×32, $x_l$ includes 64 sub-feature layers. $H_1$ performs a BN-ReLU-Conv (1×1) nonlinear operation on $x_0$ to obtain a result, and then performs a BN-ReLU-Conv (3×3) operation on the result. Similarly, $H_2$ performs an operation same as that mentioned above on the feature map formed by $[x_0, x_1]$ to obtain the result $x_2$, and the obtained result $x_2$ and $[x_0, x_1]$ are combined into $[x_0, x_1, x_2]$ as the input of $H_3$ to obtain the result $x_3$. Similarly, the obtained result $x_3$ and $[x_0, x_1, x_2]$ are combined into $[x_0, x_1, x_2, x_3]$ as the input of $H_4$. Finally, the 32×32×512 feature layer combined by $[x_0, x_1, x_2, x_3, x_4]$ continues to propagate forward for training. In the feature layer with a resolution of 16×16, $x_l$ includes 128 sub-feature layers, the feature propagation and feature layer combination same as that mentioned above are performed to finally form the 16×16×1024 feature layer that propagates forward for training.

The constructed object detection network is initialized. In the embodiment of the present invention, the number of one batch of images sent to the training model is set to 8. The parameter momentum for fine-tuning the gradient update direction according to the error is set to 0.9. The initial learning rate is set to 0.001. The weight decay regularization term is set to 0.0005. The maximum number of training iterations is set to 70000.

The constructed object detection network is trained by the obtained standardized training image set, and the images propagate by feedforward in the object detection network to obtain the training error. Convolution and pooling operations are continuously performed on each read image until the object detection network outputs the training error of each classifier.

The training error is calculated by formula (1):

$$\text{Loss}=\text{Error}_{coord}\ \text{Error}_{iou}+\text{Error}_{cls} \qquad \text{formula(1)}$$

where, Loss denotes the training error, $\text{Error}_{coord}$ denotes a prediction error of the coordinates, $\text{Error}_{iou}$ denotes an IoU error between a predicted bounding box and a true bounding box, and $\text{Error}_{cls}$ denotes a classification error.

The prediction error of the coordinates is calculated by formula (2):

$$\text{Error}_{coord} = \lambda_{coord}\sum_{i=1}^{S^2}\sum_{j=0}^{B} l_{ij}^{obj}[(x_i - \hat{x}_i)^2 + (y_i - \hat{y}_i)^2] + \\ \lambda_{coord}\sum_{i=1}^{S^2}\sum_{j=0}^{B} l_{ij}^{obj}\left[(\sqrt{w_i} - \sqrt{\hat{w}_i})^2 + (\sqrt{h_i} - \sqrt{\hat{h}_i})^2\right] \qquad \text{formula (2)}$$

where, $\lambda_{coord}$ denotes a weight assigned to the error of the coordinates; $S^2$ denotes the number of grids divided from the input image; B denotes the number of bounding boxes generated from each grid; $1_{ij}^{obj}=1$ indicates that the object falls into the $j^{th}$ bounding box of the $i^{th}$ grid, and $1_{ij}^{obj}=0$ indicates that the object does not fall into the $j^{th}$ bounding box of the $i^{th}$ grid; $\hat{x}_i$ and $\hat{y}_i$ denote a predicted x coordinate value of the center of the bounding box and a predicted y coordinate value of the center of the bounding box, respectively; $\hat{w}_i$ and $\hat{h}_i$ denote a predicted length of the bounding box and a predicted width of the bounding box, respectively; $x_i$ and $y_i$ denote a true x coordinate value of the center of the bounding box and a true y coordinate value of the center of the bounding box, respectively; and $w_i$ and $h_i$ denote a true width of the bounding box and a true length of the bounding box, respectively.

The IoU error is calculated by formula (3):

$$Error_{iou} = \sum_{i=1}^{S^2} \sum_{j=0}^{B} l_{ij}^{obj}(C_i - \hat{C}_i)^2 + \lambda_{noobj} \sum_{i=1}^{S^2} \sum_{j=0}^{B} l_{ij}^{obj}(C_i - \hat{C}_i)^2 \quad \text{formula (3)}$$

where, $\lambda_{noobj}$ denotes a weight assigned to the IoU error, $S^2$ denotes the number of the grids divided from the input image, B denotes the number of the bounding boxes generated from each grid, $l_{ij}^{obj}=1$ indicates that the object falls into the $j^{th}$ bounding box of the $i^{th}$ grid, and $l_{ij}^{obj}=0$ indicates that the object does not fall into the $j^{th}$ bounding box of the $i^{th}$ grid, $\hat{C}_i$ denotes a predicted confidence coefficient over predicting the class, and $C_i$ denotes a true confidence coefficient.

The classification error is calculated by formula (3):

$$Error_{cls} = \sum_{i=0}^{S^2} l_{ij}^{obj} \sum_{c \in classes} (p_i(c) - \hat{p}_i(c))^2 \quad \text{formula (4)}$$

where, $S^2$ denotes the number of the grids divided from the input image, $l_{ij}^{obj}=1$ indicates that the object falls into the $j^{th}$ bounding box of the $i^{th}$ grid, and $l_{ij}^{obj}=0$ indicates that the object does not fall into the $j^{th}$ bounding box of the $i^{th}$ grid, $\hat{p}_i(c)$ denotes a predicted probability that the object in the $i^{th}$ grid belongs to class c, $p_i(c)$ denotes a true probability that the object in the $i^{th}$ grid belongs to class c.

Step B30, when a preset number of training iterations is not reached or the training error is not lower than a preset threshold, the error back propagation method is employed to obtain a variation of a parameter of each layer and update a parameter of the object detection network.

Step B40, the standardized training image set is detected in a batching sequence by the updated object detection network, and the parameter of the object detection network is iteratively updated by the error back propagation method in step B30 until the preset number of the training iterations is reached or the training error is lower than the preset threshold to obtain the trained object detection network.

In the embodiment of the present invention, the maximum number of training iterations is set to 70,000. When the number of training steps reaches 70,000 or the calculated training error is lower than the preset threshold, the training of the object detection network is completed, and the object detection network is employed to detect the class of the object to be detected.

Step S30, the class of the object to be detected, the coordinates of the center of the object to be detected, and the length and the width of the detection rectangular bounding box are output.

Figure 5:
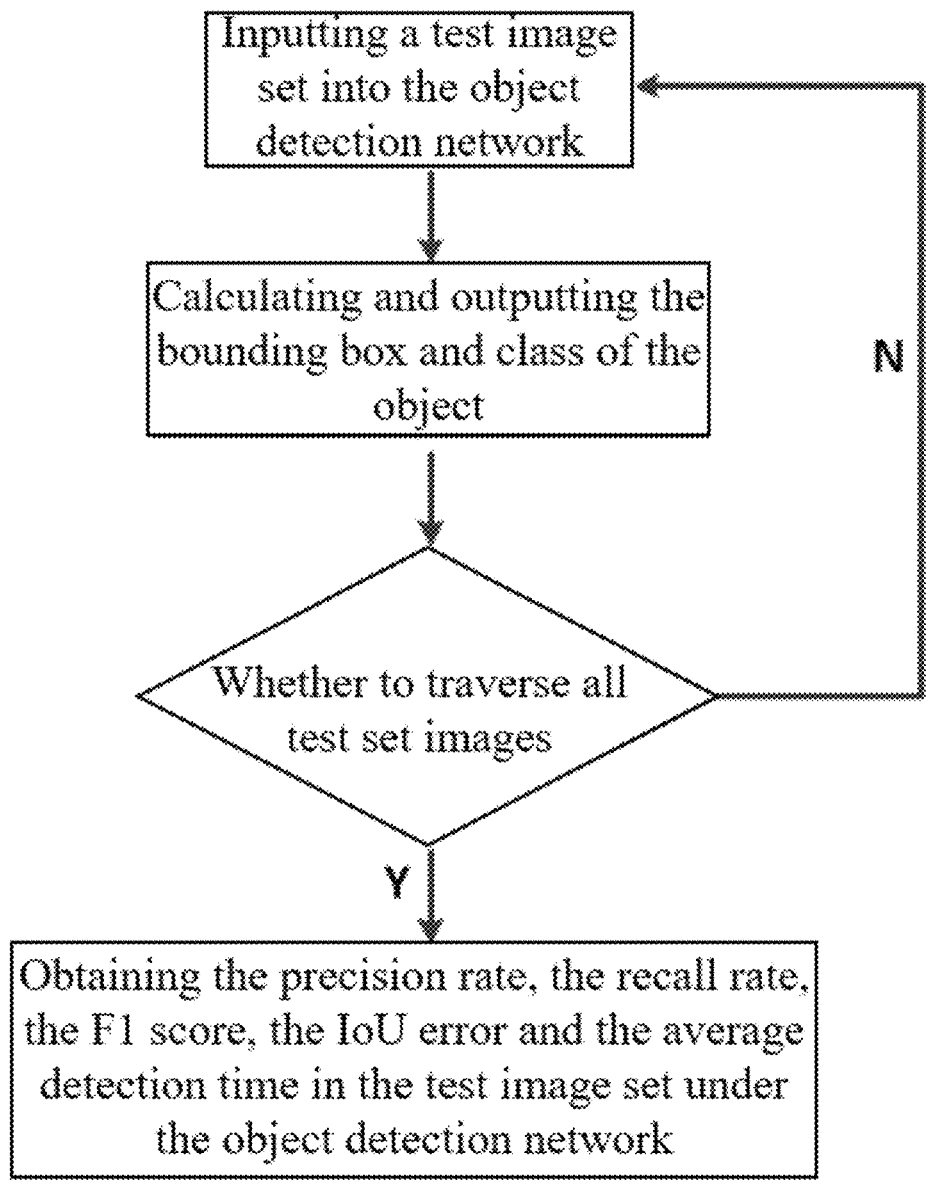
FIG. 5 is a schematic flow chart showing the testing process of the object detection network according to an embodiment of the multi-label object detection method based on the object detection network of the present invention.

In the embodiment of the present invention, the trained object detection network is tested and evaluated. FIG. 5 is a schematic flow chart showing the testing process of the object detection network according to an embodiment of the multi-label object detection method based on the object detection network of the present invention. Specifically, the testing process of the object detection network includes the following steps:

(1) The above-mentioned image optimization method of the training image set is employed to perform image format standardization processing and image enhancement processing on the images of the test image set.

In the embodiment of the present invention, 90 images of apples at different stages are used as the test image set to test the performance of the optimized object detection network, wherein the 90 images of apples are directly collected at the orchard and have a resolution of 3000×3000.

(2) The YOLO-V2 network, the YOLO-V3 network, the Faster R-CNN, and the optimized object detection network of the present invention are employed to detect the processed test image set to obtain the object class of the corresponding image in the test image set and to obtain the precision rate, the recall rate, the harmonic mean (F1 score) of the precision rate and the recall rate, the IoU value between the predicted bounding box and the true bounding box, and the average detection time.

The result thereof is shown in Table 1:

TABLE 1

| Model class | YOLO-V2 | YOLO-V3 | Faster R-CNN | Method of the present invention |
|---|---|---|---|---|
| F1 score | 0.738 | 0.793 | 0.801 | 0.817 |
| IoU value | 0.805 | 0.869 | 0.873 | 0.896 |
| Average detection time (s) | 0.273 | 0.296 | 2.42 | 0.304 |

As shown in Table 1, in terms of the object detection performance, the F1 score of the trained object detection network of the present invention is 0.817, which is 0.016 higher than that of the Faster R-CNN model with the highest F1 score among the other three models and indicates that the comprehensive performance of the recall rate and precision rate of the optimized object detection network of the present invention is higher than that of the other three models. The IoU value of the trained object detection network of the present invention is 0.896, which is higher than that of the other three models, and indicates that the detection accuracy of the optimized object detection network of the present invention is higher than that of the other three models. The average detection time of the trained object detection network of the present invention is 0.304 s, which can achieve real-time detection of apples in high-resolution images. In practical detection, the detection accuracy of the optimized object detection network of the present invention is significantly higher than that of the other three models, which reflects the superiority of the method of the present invention.

According to the second embodiment of the present invention, a multi-label object detection system based on an object detection network is provided, including an input module, an object detection module, an image enhancement module, an image format standardization module, and an output module.

The input module is configured to acquire and input an image of an object to be detected.

The object detection module is configured to process the image of the object to be detected to obtain a class of the object to be detected, coordinates of a center of the object to be detected, and a length and a width of a detection rectangular box.

The image enhancement module is configured to perform data enhancement on a training image set by using one or more selected from the group consisting of a color normalization method, a brightness transformation method, an angle transformation method, and a blurring processing method.

The image format standardization module is configured to adjust an attribute of each image in the training image set according to a standard format.

The output module is configured to output the class of the object to be detected, the coordinates of the center of the object to be detected, and the length and the width of the detection rectangular box.

Those skilled in the art can clearly understand that for the convenience and conciseness of the description, the specific working process and related description of the above-mentioned system can refer to the corresponding process of the method in the foregoing embodiment, which are not repeatedly described herein.

It should be noted that the multi-label object detection system based on the object detection network in the above embodiments is only exemplified by the division of the above functional modules. In practical applications, the above-mentioned functions can be allocated to different function modules as needed, namely, the modules or steps in the embodiment of the present invention are further decomposed or combined. For example, the modules in the above embodiments may be combined into one module, or split into multiple sub-modules to complete all or part of the functions described above. The designations of the modules and steps involved in the embodiments of the present invention are only used for distinguishing these modules or steps, and should not be construed as an improper limitation on the present invention.

According to the third embodiment of the present invention, a storage device is provided. A plurality of programs are stored in the storage device, and the plurality of programs are loaded and executed by a processor to achieve the multi-label object detection method based on the object detection network mentioned above.

According to the fourth embodiment of the present invention, a processing device is provided, including a processor and a storage device. The processor is configured to execute a plurality of programs. The storage device is configured to store the plurality of programs. The plurality of programs are loaded and executed by the processor to achieve the multi-label object detection method based on the object detection network mentioned above.

Those skilled in the art can clearly understand that for the convenience and conciseness of the description, the specific working process and related description of the storage device and processing device described above can refer to the corresponding process of the method in the foregoing embodiments, which are not repeatedly described herein.

Those skilled in the art can realize that the modules, and steps of method described in the embodiments herein can be implemented by electronic hardware, computer software, or a combination of the electronic hardware and the computer software. The programs corresponding to modules of software and steps of method can be stored in a random access memory (RAM), a memory, a read-only memory (ROM), an electrically programmable ROM, an electrically erasable programmable ROM, a register, a hard disk, a removable disk, a compact disc-read only memory (CD-ROM) or any other form of storage mediums known in the technical field. In the above description, the composition and steps of each embodiment have been described in terms of the functions to clearly explain the interchangeability of electronic hardware and software. Whether these functions are performed by electronic hardware or software depends on the specific application and designed constraint conditions of the technical solution. Those skilled in the art can use different methods to implement the described functions for each specific application, but such implementation should not be construed to be beyond the scope of the present invention.

The terminology "include/comprise" and any other similar terminologies are used to cover non-exclusive inclusions, so that a process, method, article, equipment or device including a series of elements not only include these elements, but also include other elements that are not explicitly listed, or include elements inherent in the process, method, article, equipment or device.

Hereto, the technical solutions of the present invention have been described in combination with the preferred embodiments with reference to the drawings. However, it is easily understood by those skilled in the art that the scope of protection of the present invention is obviously not limited to these specific embodiments. Those skilled in the art can make equivalent modifications or replacements to related technical features without departing from the principles of the present invention, and the technical solutions obtained by these modifications or replacements shall fall within the scope of protection of the present invention.

What is claimed is:

1. A multi-label object detection method based on an object detection network, comprising:
   step S10, selecting an image of an object to be detected as an input image;
   step S20, based on the object detection network, obtaining a class of the object to be detected, coordinates of a center of the object to be detected, and a length and a width of a detection rectangular box according to the input image; and
   step S30, outputting the class of the object to be detected, the coordinates of the center of the object to be detected, and the length and the width of the detection rectangular box;
   wherein the object detection network is trained and obtained by replacing a low-resolution feature layer in a You Only Look Once-V3 (YOLO-V3) network with a densely connected convolutional network.

2. The multi-label object detection method based on the object detection network according to claim 1, wherein, a method of training the object detection network comprises the following steps:
   step B10, adjusting an attribute of each image in an obtained training image set according to a standard format to obtain a standardized training image set;
   step B20, detecting a batch of images in the standardized training image set by using the object detection network, and calculating a training error of each classifier of the object detection network;
   step B30, when a preset number of training iterations is not reached or the training error is greater than or equal to a preset threshold, obtaining a variation of a parameter of each layer in the object detection network and updating a parameter of the object detection network by an error back propagation method; and
   step B40, detecting the standardized training image set in a batching sequence after the parameter of the object detection network is updated, and iteratively updating the parameter of the object detection network by the error back propagation method in step B30 until the preset number of the training iterations is reached or the training error is lower than the preset threshold to obtain the object detection network.

3. The multi-label object detection method based on the object detection network according to claim 2, wherein, the training error is calculated by the following formula:

$$Loss = Error_{coord} + Error_{iou} + Error_{cls}$$

where, Loss denotes the training error, $Error_{coord}$ denotes a prediction error of the coordinates, $Error_{iou}$ denotes an Intersection over Union (IoU) error between a predicted bounding box and a true bounding box, and $Error_{cls}$ denotes a classification error.

4. The multi-label object detection method based on the object detection network according to claim 3, wherein, the prediction error of the coordinates is calculated by the following formula:

$$Error_{coord} = \lambda_{coord} \sum_{i=1}^{S^2} \sum_{j=0}^{B} l_{ij}^{obj} [(x_i - \hat{x}_i)^2 + (y_i - \hat{y}_i)^2] +$$

$$\lambda_{coord} \sum_{i=1}^{S^2} \sum_{j=0}^{B} l_{ij}^{obj} \left[ \left(\sqrt{w_i} - \sqrt{\hat{w}_i}\right)^2 + \left(\sqrt{h_i} - \sqrt{\hat{h}_i}\right)^2 \right]$$

where, $\lambda_{corrd}$ denotes a weight assigned to the prediction error of the coordinates;

$S^2$ denotes a number of grids divided from the input image; B denotes a number of bounding boxes generated from each grid of the grids divided from the input image; $l_{ij}^{obj}=1$ indicates that the object falls into a $j^{th}$ bounding box of an $i^{th}$ grid of the grids divided from the input image, and $l_{ij}^{obj}=0$ indicates that the object does not fall into the $j^{th}$ bounding box of the $i^{th}$ grid; $\hat{x}_i$ and $\hat{y}_i$ denote a predicted x coordinate value of the center of the bounding box and a predicted y coordinate value of the center of the bounding box, respectively; $\hat{w}_i$ and $\hat{h}_i$ denote a predicted length of the bounding box and a predicted width of the bounding box, respectively; $x_i$ and $y_i$ denote a true x coordinate value of the center of the bounding box and a true y coordinate value of the center of the bounding box, respectively; and $w_i$ and $h_i$ denote a true length of the bounding box and a true width of the bounding box, respectively.

5. The multi-label object detection method based on the object detection network according to claim 3, wherein, the IoU error between the predicted bounding box and the true bounding box is calculated by the following formula:

$$Error_{iou} = \sum_{i=1}^{S^2} \sum_{j=0}^{B} l_{ij}^{obj} (C_i - \hat{C}_i)^2 + \lambda_{noobj} \sum_{i=1}^{S^2} \sum_{j=0}^{B} l_{ij}^{obj} (C_i - \hat{C}_i)^2$$

where, $\lambda_{noobj}$ denotes a weight assigned to the IoU error between the predicted bounding box and the true bounding box, $S^2$ denotes a number of grids divided from the input image, B denotes a number of bounding boxes generated from each grid of the grids divided from the input image, $l_{ij}^{obj}=1$ indicates that the object falls into a $j^{th}$ bounding box of an $i^{th}$ grid of the grids divided from the input image, and $l_{ij}^{obj}=0$ indicates that the object does not fall into the $j^{th}$ bounding box of the $i^{th}$ grid, $\hat{C}_i$ denotes a predicted confidence coefficient over predicting the class, and $C_i$ denotes a true confidence coefficient.

6. The multi-label object detection method based on the object detection network according to claim 3, wherein, the classification error is calculated by the following formula:

$$Error_{cls} = \sum_{i=0}^{S^2} l_{ij}^{obj} \sum_{c \in classes} (p_i(c) - \hat{p}_i(c))^2$$

where, $S^2$ denotes a number of a grids divided from the input image, $l_{ij}^{obj}=1$ indicates that the object falls into a $j^{th}$ bounding box of an $i^{th}$ grid, and $l_{ij}^{obj}=0$ indicates that the object does not fall into the $j^{th}$ bounding box of the $i^{th}$ grid, $\hat{p}_i(c)$ denotes a predicted probability that the object in the $i^{th}$ grid belongs to a class c, $p_i(c)$ denotes a true probability that the object in the $i^{th}$ grid belongs to the class c.

7. The multi-label object detection method based on the object detection network according to claim 2, wherein, before the step B10 of "adjusting the attribute of the each image in the obtained training image set according to the standard format", the multi-label object detection method further comprises:

performing a data enhancement on the each image in the obtained training image set to obtain an enhanced training image set, wherein, a method of performing the data enhancement comprises one or more selected from the group consisting of a color normalization method, a brightness transformation method, an angle transformation method, and a blurring processing method.

8. A multi-label object detection system based on an object detection network, comprising an input module, an object detection module, an image enhancement module, an image format standardization module, and an output module; wherein the input module is configured to acquire and input an image of an object to be detected;

the object detection module is configured to obtain a class of the object to be detected, coordinates of a center of the object to be detected, and a length and a width of a detection rectangular box based on the object detection network after being trained according to the input image;

the image enhancement module is configured to perform a data enhancement on a training image set by using one or more selected from the group consisting of a color normalization method, a brightness transformation method, an angle transformation method, and a blurring processing method;

the image format standardization module is configured to adjust an attribute of each image in the training image set according to a standard format; and the output module is configured to output the class of the object to be detected, the coordinates of the center of the object to be detected, and the length and the width of the detection rectangular box.

9. A storage device, wherein a plurality of programs are stored in the storage device, and the plurality of programs are loaded and executed by a processor to achieve the multi-label object detection method based on the object detection network according to claim 1.

10. A processing device, comprising:

a processor, wherein the processor is configured to execute a plurality of programs, and a storage device, wherein the storage device is configured to store the plurality of programs; wherein the plurality of programs are loaded and executed by the processor to achieve the multi-label object detection method based on the object detection network according to claim 1.

11. The storage device according to claim 9, wherein, a method of training the object detection network comprises the following steps:
step B10, adjusting an attribute of each image in an obtained training image set according to a standard format to obtain a standardized training image set;
step B20, detecting a batch of images in the standardized training image set by using the object detection network, and calculating a training error of each classifier of the object detection network;
step B30, when a preset number of training iterations is not reached or the training error is greater than or equal to a preset threshold, obtaining a variation of a parameter of each layer in the object detection network and updating a parameter of the object detection network by an error back propagation method; and
step B40, detecting the standardized training image set in a batching sequence after the parameter of the object detection network is updated, and iteratively updating the parameter of the object detection network by the error back propagation method in step B30 until the preset number of the training iterations is reached or the training error is lower than the preset threshold to obtain the object detection network.

12. The storage device according to claim 11, wherein, the training error is calculated by the following formula:

Loss=Error$_{coord}$ Error$_{iou}$+Error$_{cls}$ where, Loss denotes the training error, Error$_{coord}$ denotes a prediction error of the coordinates, Error$_{iou}$ denotes an Intersection over Union (IoU) error between a predicted bounding box and a true bounding box, and Error$_{cls}$ denotes a classification error.

13. The storage device according to claim 12, wherein, the prediction error of the coordinates is calculated by the following formula:

$$Error_{coord} = \lambda_{coord}\sum_{i=1}^{S^2}\sum_{j=0}^{B} l_{ij}^{obj}[(x_i - \hat{x}_i)^2 + (y_i - \hat{y}_i)^2] +$$

$$\lambda_{coord}\sum_{i=1}^{S^2}\sum_{j=0}^{B} l_{ij}^{obj}\left[\left(\sqrt{w_i} - \sqrt{\hat{w}_i}\right)^2 + \left(\sqrt{h_i} - \sqrt{\hat{h}_i}\right)^2\right]$$

where, $\lambda_{corrd}$ denotes a weight assigned to the prediction error of the coordinates; $S^2$ denotes a number of grids divided from the input image; B denotes a number of bounding boxes generated from each grid of the grids divided from the input image; $l_{ij}^{obj}=1$ indicates that the object falls into a $j^{th}$ bounding box of an $i^{th}$ grid of the grids divided from the input image, and $l_{ij}^{obj}=0$ indicates that the object does not fall into the $j^{th}$ bounding box of the $i^{th}$ grid; $\hat{x}_i$ and $\hat{y}_i$ denote a predicted x coordinate value of the center of the bounding box and a predicted y coordinate value of the center of the bounding box, respectively; $\hat{w}_i$ and $\hat{h}_i$ denote a predicted length of the bounding box and a predicted width of the bounding box, respectively; $x_i$ and $y_i$ denote a true x coordinate value of the center of the bounding box and a true y coordinate value of the center of the bounding box, respectively; and $w_i$ and $h_i$ denote a true length of the bounding box and a true width of the bounding box, respectively.

14. The storage device according to claim 12, wherein, the IoU error between the predicted bounding box and the true bounding box is calculated by the following formula:

$$Error_{iou} = \sum_{i=1}^{S^2}\sum_{j=0}^{B} l_{ij}^{obj}(C_i - \hat{C}_i)^2 + \lambda_{noobj}\sum_{i=1}^{S^2}\sum_{j=0}^{B} l_{ij}^{obj}(C_i - \hat{C}_i)^2$$

where, $\lambda_{noobj}$ denotes a weight assigned to the IoU error between the predicted bounding box and the true bounding box, $S^2$ denotes a number of grids divided from the input image, B denotes a number of bounding boxes generated from each grid of the grids divided from the input image, $l_{ij}^{obj}=1$ indicates that the object falls into a $j^{th}$ bounding box of an $i^{th}$ grid of the grids divided from the input image, and $l_{ij}^{obj}=0$ indicates that the object does not fall into the $j^{th}$ bounding box of the $i^{th}$ grid, $\hat{C}_i$ denotes a predicted confidence coefficient over predicting the class, and $C_i$ denotes a true confidence coefficient.

15. The storage device according to claim 12, wherein, the classification error is calculated by the following formula:

$$Error_{cls} = \sum_{i=0}^{S^2} l_{ij}^{obj} \sum_{c \in classes} (p_i(c) - \hat{p}_i(c))^2$$

where, $S^2$ denotes a number of a grids divided from the input image, $l_{ij}^{obj}=1$ indicates that the object falls into a $j^{th}$ bounding box of an $i^{th}$ grid, and $l_{ij}^{obj}=1$ indicates that the object does not fall into the $j^{th}$ bounding box of the $i^{th}$ grid, $\hat{p}_i$ (c) denotes a predicted probability that the object in the $i^{th}$ grid belongs to a class c, $p_i$(c) denotes a true probability that the object in the $i^{th}$ grid belongs to the class c.

16. The storage device according to claim 11, wherein, before the step B10 of "adjusting the attribute of the each image in the obtained training image set according to the standard format", the multi-label object detection method further comprises:
performing a data enhancement on the each image in the obtained training image set to obtain an enhanced training image set, wherein, a method of performing the data enhancement comprises one or more selected from the group consisting of a color normalization method, a brightness transformation method, an angle transformation method, and a blurring processing method.

17. The storage device according to claim 9, wherein, a method of training the object detection network comprises the following steps:
step B10, adjusting an attribute of each image in an obtained training image set according to a standard format to obtain a standardized training image set;
step B20, detecting a batch of images in the standardized training image set by using the object detection network, and calculating a training error of each classifier of the object detection network;
step B30, when a preset number of training iterations is not reached or the training error is greater than or equal to a preset threshold, obtaining a variation of a parameter of each layer in the object detection network and updating a parameter of the object detection network by an error back propagation method; and step B40, detecting the standardized training image set in a batching sequence after the parameter of the object detection network is updated, and iteratively updating the parameter of the object detection network by the error back propagation method in step B30 until the preset number of the training iterations is reached or the training error is lower than the preset threshold to obtain the object detection network.

18. The storage device according to claim 11, wherein, the training error is calculated by the following formula:

$$Loss = Error_{coord} \, Error_{iou} + Error_{cls}$$

where, Loss denotes the training error, $Error_{coord}$ denotes a prediction error of the coordinates, $Error_{iou}$ denotes an Intersection over Union (IoU) error between a predicted bounding box and a true bounding box, and $Error_{cls}$ denotes a classification error.

19. The storage device according to claim 12, wherein, the prediction error of the coordinates is calculated by the following formula:

$$Error_{coord} = \lambda_{coord} \sum_{i=1}^{S^2} \sum_{j=0}^{B} l_{ij}^{obj} [(x_i - \hat{x}_i)^2 + (y_i - \hat{y}_i)^2] +$$

$$\lambda_{coord} \sum_{i=1}^{S^2} \sum_{j=0}^{B} l_{ij}^{obj} \left[ \left( \sqrt{w_i} - \sqrt{\hat{w}_i} \right)^2 + \left( \sqrt{h_i} - \sqrt{\hat{h}_i} \right)^2 \right]$$

where, $\lambda_{corrd}$ denotes a weight assigned to the prediction error of the coordinates;

$S^2$ denotes a number of grids divided from the input image; B denotes a number of bounding boxes generated from each grid of the grids divided from the input image; $l_{ij}^{obj}=1$ indicates that the object falls into a $j^{th}$ bounding box of an $i^{th}$ grid of the grids divided from the input image, and $l_{ij}^{obj}=0$ indicates that the object does not fall into the $j^{th}$ bounding box of the $i^{th}$ grid; $\hat{x}_i$ and $\hat{y}_i$ denote a predicted x coordinate value of the center of the bounding box and a predicted y coordinate value of the center of the bounding box, respectively; $\hat{w}_i$ and $\hat{h}_i$ denote a predicted length of the bounding box and a predicted width of the bounding box, respectively; $x_i$ and $y_i$ denote a true x coordinate value of the center of the bounding box and a true y coordinate value of the center of the bounding box, respectively; and $w_i$ and $h_i$ denote a true length of the bounding box and a true width of the bounding box, respectively.

20. The storage device according to claim 12, wherein, the IoU error between the predicted bounding box and the true bounding box is calculated by the following formula:

$$Error_{iou} = \sum_{i=1}^{S^2} \sum_{j=0}^{B} l_{ij}^{obj} (C_i - \hat{C}_i)^2 + \lambda_{noobj} \sum_{i=1}^{S^2} \sum_{j=0}^{B} l_{ij}^{obj} (C_i - \hat{C}_i)^2$$

where, $\lambda_{noobj}$ denotes a weight assigned to the IoU error between the predicted bounding box and the true bounding box, $S^2$ denotes a number of grids divided from the input image, B denotes a number of bounding boxes generated from each grid of the grids divided from the input image, $l_{ij}^{obj}=1$ indicates that the object falls into a $j^{th}$ bounding box of an $i^{th}$ grid of the grids divided from the input image, and $l_{ij}^{obj}=1$ indicates that the object does not fall into the $j^{th}$ bounding box of the $i^{th}$ grid, $\hat{C}_i$ denotes a predicted confidence coefficient over predicting the class, and $C_i$ denotes a true confidence coefficient.

* * * * *